United States Patent
Asokan et al.

(10) Patent No.: US 7,783,041 B2
(45) Date of Patent: Aug. 24, 2010

(54) SYSTEM, METHOD AND COMPUTER PROGRAM PRODUCT FOR AUTHENTICATING A DATA AGREEMENT BETWEEN NETWORK ENTITIES

(75) Inventors: Nadarajah Asokan, Espoo (FI); Kaisa Nyberg, Helsinki (FI)

(73) Assignee: Nokia Corporation, Espoo (FI)

( * ) Notice: Subject to any disclaimer, the term of this patent is extended or adjusted under 35 U.S.C. 154(b) by 991 days.

(21) Appl. No.: 11/242,374

(22) Filed: Oct. 3, 2005

(65) Prior Publication Data

US 2007/0076879 A1    Apr. 5, 2007

(51) Int. Cl.
*H04K 1/00* (2006.01)
(52) U.S. Cl. .................................. 380/255; 713/171
(58) Field of Classification Search .............. 380/255, 380/278–285, 277, 44–47, 256, 257, 258, 380/259, 260, 261, 262, 270, 286, 59; 713/168, 713/169, 171, 170, 151, 172, 177, 180, 181; 726/2, 5, 9, 10
See application file for complete search history.

(56) References Cited

U.S. PATENT DOCUMENTS

| | | | | |
|---|---|---|---|---|
| 4,956,863 | A * | 9/1990 | Goss | 380/30 |
| 5,450,493 | A * | 9/1995 | Maher | 380/30 |
| 5,491,749 | A * | 2/1996 | Rogaway | 713/171 |
| 5,515,441 | A * | 5/1996 | Faucher | 380/30 |
| 5,581,615 | A * | 12/1996 | Stern | 713/180 |
| 5,588,060 | A * | 12/1996 | Aziz | 380/30 |
| 6,058,476 | A * | 5/2000 | Matsuzaki et al. | 713/169 |
| 6,076,163 | A * | 6/2000 | Hoffstein et al. | 713/168 |
| 6,225,888 | B1 * | 5/2001 | Juopperi | 340/5.8 |
| 6,336,188 | B2 * | 1/2002 | Blake-Wilson et al. | 713/171 |
| 6,711,400 | B1 * | 3/2004 | Aura | 455/411 |
| 6,766,453 | B1 * | 7/2004 | Nessett et al. | 713/171 |

(Continued)

FOREIGN PATENT DOCUMENTS

EP    0 535 863 A2    4/1993

(Continued)

OTHER PUBLICATIONS

Menezes, applied cryptography, 1997, CRC Press LLC, p. 400-405.*

(Continued)

*Primary Examiner*—Michael Pyzocha
*Assistant Examiner*—Abu Sholeman
(74) *Attorney, Agent, or Firm*—Alston & Bird LLP

(57) ABSTRACT

A method for authenticating a data agreement between first and second network entities can include the first network entity committing to the agreed data value, and transmitting the committed data value and a first random value to the second network entity. The first network entity can receive a second random value, and can then open the committed data value such that the second network entity can check the committed data value. If successful, the second network entity can calculate a third check string, and the first network entity can similarly calculate a fourth check string, based upon the data value and the first and second random values. The first network entity can calculate the fourth check string without the second network entity committing to the data value. The method can then include comparing the check strings such that the agreed data can be considered authenticated based upon the comparison.

42 Claims, 5 Drawing Sheets

U.S. PATENT DOCUMENTS

| | | | |
|---|---|---|---|
| 6,868,160 B1* | 3/2005 | Raji | 380/30 |
| 7,142,674 B2* | 11/2006 | Brickell | 380/44 |
| 7,334,127 B2* | 2/2008 | Struik | 713/168 |
| 7,567,672 B2* | 7/2009 | Furukawa | 380/255 |
| 2001/0016908 A1* | 8/2001 | Blake-Wilson et al. | 713/171 |
| 2002/0120844 A1* | 8/2002 | Faccin et al. | 713/168 |
| 2002/0186846 A1* | 12/2002 | Nyberg et al. | 380/273 |
| 2003/0044019 A1* | 3/2003 | Vanstone et al. | 380/277 |
| 2003/0233550 A1* | 12/2003 | Brickell | 713/171 |
| 2004/0081321 A1* | 4/2004 | Struik | 380/278 |
| 2005/0008152 A1* | 1/2005 | MacKenzie | 380/44 |
| 2005/0008159 A1* | 1/2005 | Grilli et al. | 380/270 |
| 2005/0132192 A1* | 6/2005 | Jeffries et al. | 713/169 |
| 2006/0050877 A1* | 3/2006 | Nakamura | 380/46 |
| 2006/0205386 A1* | 9/2006 | Yu et al. | 455/411 |
| 2008/0294726 A1* | 11/2008 | Sidman | 709/206 |

FOREIGN PATENT DOCUMENTS

| | | | |
|---|---|---|---|
| EP | 0535863 | * | 4/1993 |
| EP | 1 248 408 A2 | | 10/2002 |
| EP | 1248408 | * | 10/2002 |
| WO | WO 2005/002131 | * | 1/2005 |
| WO | WO 2005/002131 A1 | | 1/2005 |

OTHER PUBLICATIONS

Frank Stajano and Ross Anderson, The Resurrecting Duckling: Security Issues for Ad-hoc wireless Networks, 1999, Springer-verlag Berlin Heidelberg. pp. 1-11.*

Office Action issued May 25, 2010 in corresponding Chinese Application No. 200680032566.3.

* cited by examiner

SYSTEM, METHOD AND COMPUTER PROGRAM PRODUCT FOR AUTHENTICATING A DATA AGREEMENT BETWEEN NETWORK ENTITIES

FIELD OF THE INVENTION

The present invention generally relates to systems and methods for authenticating a data agreement between network entities and, more particularly, relates to systems and methods for authenticating a key agreement between network entities during establishment of a connection therebetween.

BACKGROUND OF THE INVENTION

In this specification the concept of short-range wireless data transmission connection refers primarily to such connections in which two or more devices or entities that are located relatively close to each other can communicate with each other in a wireless manner. In the communication it can be possible to apply for example radio communication, infrared communication, inductive communication, or the like. For example the Bluetooth™ technology, in which low-power radio transmitters and radio receivers are used, has been developed for the purpose of short-range radio communication. Such devices can communicate with each other and thereby form an ad-hoc network. For example, by applying short-range communication technology peripheral devices can be wirelessly connected to a computer. Furthermore, for example, a wireless communication device can be coupled to a portable computer, where from the computer it can be possible to have a wireless connection to another communication network, such as the Internet. Thus, a situation may occur in which, the user has to enter his/her user identification and password when he/she sets up a connection to a data network by means of the portable computer. Thus, without encryption between the portable computer and a wireless communication device connected thereto with a short-range wireless connection, there can be a risk eavesdropping on the user identification and password transmission.

Other possible implementation areas for short-range data transmission connections that can be mentioned in this context include wireless local area network (WLAN) techniques such as IEEE 802.11 (e.g., 802.11a, 802.11b, 802.11g, 802.11n, etc.), WiMAX techniques such as IEEE 802.16, ultra wideband (UWB) techniques such as IEEE 802.15, wireless universal serial bus (WUSB) techniques, wireless pay terminal techniques and wirelessly operating lock techniques. By means of techniques such as WLAN, WiMAX, UWB and WUSB, for example, small office facilities can implement a LAN including several computers without having to conduct cabling. In a wireless pay terminal system, for example, a user can pay bills by means of a wireless communication device that includes contains short-range communication means. Thus, a short-range data connection can be set up between the wireless communication device and the pay terminal for the purpose of paying bills. Correspondingly, in a wirelessly operating lock the user has a key that communicates wirelessly with the lock to ensure that the key in question is intended for controlling the function of this particular lock. Such a key may be implemented as a separate key, or it may be implemented in connection with another device, such as a wireless communication device.

In such communication systems it can be problematic how the different parties in the communication can be sure that the devices in question are really authorized to the communication process. This can be important especially in such situations where confidential information is transferred between different devices. In the aforementioned pay terminal embodiment, for example, the pay terminal has to ensure that the device used in the payment transaction really is the device used by the account holder in question or a person authorized by the account holder. Also in the lock embodiment, for example, the lock has to ensure the authenticity of the key before the lock is opened. In such embodiments, for the purpose of verifying the parties, the communication between the devices has to be protected as well as possible from outside intruders, such as eavesdroppers and intervening parties. To take these safety aspects into account, a number of different encryption mechanisms have been developed, such as for Bluetooth™ systems. The techniques that are used include, for example, a key pair (PKI—Public Key Infrastructure) including of a public key and a private key. In such an arrangement, the user has a public key and a certificate from the PKI that he/she can send unencrypted to a counterparty, and a private key that does not have to be transferred to the communication system at any stage, but is instead maintained in secrecy. Thus, it can be possible to transmit encrypted information to the user by encrypting the information with the public key. The user can decrypt the information with his/her private key.

One drawback of the asymmetric encryption system of the above kind is that it can be relatively slow, where encryption of large amounts of information considerably decelerates data transmission. Another drawback of such an asymmetric encryption system is that if there is no certificate for the public key, the counterparty cannot trust the public key it receives from the user because an unauthorized party may have replaced the public key with his own public key. In ad hoc scenarios, the presence of a certificate authority for authenticating the exchange of public keys can generally not be assumed, thereby requiring other means for authenticating the exchange of public keys.

Communication systems also apply symmetric encryption techniques in which both parties of the communication share the same private key (shared, secret key). A problem in this arrangement can be, for example, how this private key can be transmitted to another device so that an outsider cannot find out the private key. In some cases the user himself/herself can enter this private key to different devices. In a device according to the Bluetooth™ system this private key can be utilized to calculate a link key used in the radio communication, by means of which link key the actual information to be transmitted is encrypted. The maximum length determined for the link key is 128 bits, where the length of the private key should be at least 32 characters. It can be laborious to enter such a string containing 32 characters, and there can be high probability of errors, especially when the string has to be entered successively at least twice without errors before the connection can be set up.

One encryption technique designed to overcome the drawbacks of the aforementioned asymmetric and symmetric encryption systems is disclosed in U.S. Pat. No. 5,241,599. In this regard, the '599 patent discloses a technique for encrypted key exchange (EKE) in which the encryption key used in the communication is first encrypted with a short encryption key, after which the encryption key can be transmitted in the encrypted format from one device to another via an unencrypted communication channel. In short-range systems this technique can be applied in such a manner that the user enters the short encryption key into both devices, after which both devices transmit the encryption key of their own to the other device, encrypted with a short encryption key. However, such systems may experience a drawback in that the encryption efficiency depends, for example, upon how often the user changes this short encryption key. Furthermore such a short encryption key selected by the user can be guessed relatively easily, and therefore when the technique is applied, it is possible that outsiders find out the short encryption key.

There is also a known so-called Diffie-Hellman technique, which is based on exponentiation modulo of a large prime number. In this regard, on the basis of such an exponentiation modulo, the difficulty in breaking encryption implemented with the Diffie-Hellman technique is today regarded as being directly proportional to the difficulty of calculating discrete logarithms modulo of a large prime number. The Diffie-Hellman technique is a public key based algorithm generally used especially in key exchange. The technique is often considered safe when keys of sufficient length and an appropriate Diffie-Hellman generator are used.

In accordance with the Diffie-Hellman technique, a first party determines a first key number on the basis of a first secret number and the first key number is transmitted to a second party. Correspondingly, the second party determines a second key number on the basis of a second secret number and the second key number is transmitted to the first party. Thereafter the first party generates a third key number on the basis of the first secret number and the second key number it has received, and the second party generates a fourth key number on the basis of the second secret number and the first key number it has received. The third and the fourth key numbers are identical, and they are not transmitted between the parties involved. The third and the fourth key number can thereafter be used for encryption and decryption of information to be transmitted between the parties.

In Diffie-Hellman technique as in other techniques (asymmetric) exchanging public keys without external means (e.g., certificate) for authenticating the public keys, however, a third party may be capable of changing the first key number or the second key number. This can take place, for example, in such a manner that the third party places itself between the first and the second party (MIM—Man in the Middle), wherein the first party mistakes the third party for the second party, and, in a corresponding manner, the second party mistakes the third party for the first party. Thus, in practice, data can be transmitted between the first and the second party via the third party, and the third party can detect both the messages transmitted by the first party and the messages transmitted by the second party, and can modify them. For more information on the Diffie-Hellman technique, see U.S. Pat. No. 4,200,770, the content of which is incorporated by reference in its entirety.

An improvement has been suggested for the Diffie-Hellman technique, by means of which different parties in a short-range wireless communication technique can be verified. The technique is disclosed in the publication F. Stajano & R. Anderson, *The Resurrecting Duckling: Security Issues for Ad-Hoc Wireless Networks*, 1999 AT&T SOFTWARE SYMPOSIUM. The technique disclosed in this publication is based on both parties checking that the third and the fourth encryption numbers obtained as a result of the actions described above are identical. This can be conducted, for example, in such a manner that the calculated encryption numbers are displayed in the devices of both parties and the users of the devices compare these numbers with each other. To attain a sufficiently strong encryption (an encryption key of at least 128 bits), the encryption numbers typically have to be strings of at least 32 characters. However, it can be difficult to compare such lengthy strings, and the error probability can be undesirably high.

SUMMARY OF THE INVENTION

In an effort to at least partially overcome the drawbacks of the aforementioned conventional encryption systems and methods, a system and method has been developed that permits verifying the parties communicating with one another without requiring long and complex encryption keys or check numbers. Such a system and method is disclosed in U.S. patent application Ser. No. 10/164,437 entitled: Method for Ensuring Data Transmission Security, Communication System and Communication Device, filed Jun. 5, 2002 and published Dec. 12, 2002 as U.S. Patent Application Publication No. 2002/0186846, the content of which is hereby incorporated by reference. In accordance with the system and method of the '437 application, a short unique random string can be selected, from which a check code can be calculated in both devices to facilitate data transmission security. The calculated check code can then be presented by one or both devices. If both devices present the check code they have calculated, the codes can be compared with each other. If only one device presents the check code, however, the presented check code can be input to the other device, which can then compare the input check code to a similarly calculated check code.

Whereas systems and methods such as those described above are adequate, it is generally desirable to improve upon existing systems and methods, including those of the '437 application. Accordingly, exemplary embodiments of the present invention provide network entities, methods and computer program products for authenticating a data agreement between first and second network entities, such as during establishment of a connection therebetween. According to one aspect of the present invention, the method can include the first network entity committing to a first data value, such as a first key (e.g., P1), a data string known to both the first and second network entities (e.g., D) or the like. In this regard, the first network entity can commit to the first data value by forming a first check string (e.g., C1) based upon a selected first random value (e.g., R1), and transmitting the first check string to the second network entity. The first check string can be formed further based upon the first data value, or independent of the first data value. When the first check string is formed independent of the first data value, such as when the second network entity does not already know the first key or data value, the first network entity can further transmit the first key or data value to the second network entity.

After receiving the first check string, the second network entity can transmit, to the first network entity, a selected random value (e.g., R2) and a second data value (e.g., P2, D). After receiving the second data value and the second random value, the first network entity can open the commitment to the first data value by transmitting the first random value to the second network entity such that the second network entity is capable of checking the committed first data value. This can also involve the first network entity transmitting the first data value, or a part of it, to the second network entity. In this regard, the second network entity can check the committed first data value based upon the first check string and a second check string (e.g., C2). The second check string in such instances may have been calculated based upon the first random value, and the first data value known or transmitted to the second network entity.

After checking the committed first data value, and if the check is successful, the second network entity can be capable of calculating a third check string (e.g., C3) based upon the first and second data values and the first and second random values. Similarly, the first network entity can calculate a fourth check string (e.g., C4) based upon the first and second data values and the first and second random values. In this regard, the first network entity can calculate the fourth check string without the second network entity committing to the second data value or opening the commitment to the second data value. After the third and fourth check strings are calculated, the method can include comparing or facilitating comparison of the third and fourth check strings such that the data values and/or key agreement can be considered authenticated based upon the comparison, such as if a match between the third and fourth check strings is identified.

The committing, transmitting, opening, calculating and comparing steps of the method can occur at a plurality of instances of authenticating the data and/or key agreement between the first network entity and the second network entity or one or more other network entities. In such instances, the selected first random value and/or the selected second random value can differ for at least some of the instances. Conversely, the first data value and/or the second data value can remain the same for at least some of the instances. Thus, the first and/or the second data values can be reusable by the respective network entities for different instances of authenticating a key agreement.

According to other aspects of the present invention, first and second network entities, and a computer program product, are provided for authenticating a key agreement between first and second network entities during establishment of a connection therebetween. By operating with reusable data values, the network entities, methods and computer program products of exemplary embodiments of the present invention are capable of avoiding having to generate new first and second data values for each association of two network entities, which may otherwise require an undesirable amount of time and resources, particularly when the data values comprise keys. By allowing data values and keys to be transmitted and agreed upon within the steps of the authentication, the method of exemplary embodiments of the present invention can reduce the total number of steps, and also the number of steps where control by the user may be required. Also, by authenticating the key agreement based upon a reduced number of message exchanges, the network entities, methods and computer program products of exemplary embodiments of the present invention provide an efficient checking stage for authenticating the key agreement between the network entities. The network entities, methods and computer program products of exemplary embodiments of the present invention may therefore solve the problems identified by prior techniques and may provide additional advantages.

BRIEF DESCRIPTION OF THE DRAWINGS

Figure 1:
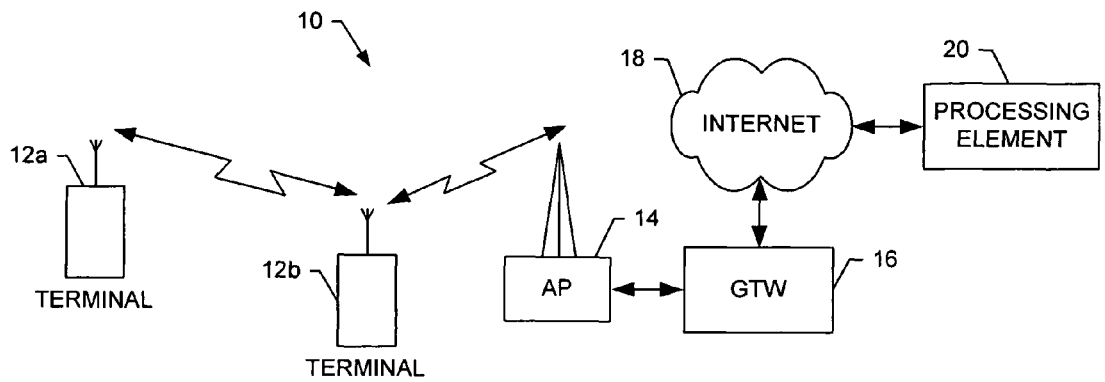
Figure 2:
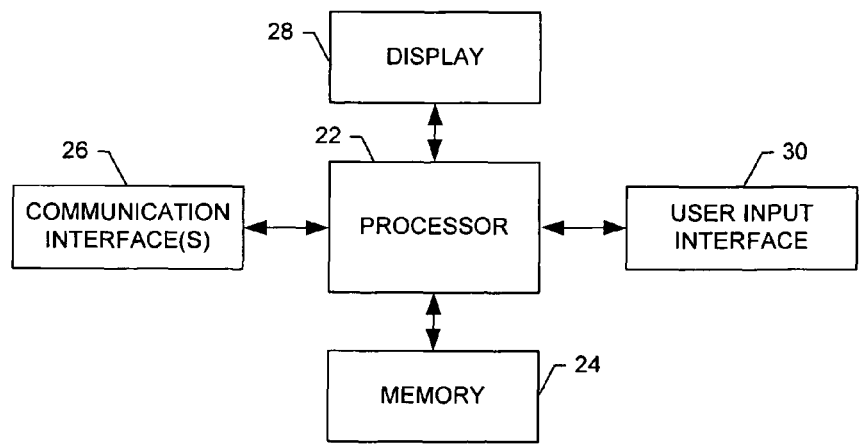
Figure 3:
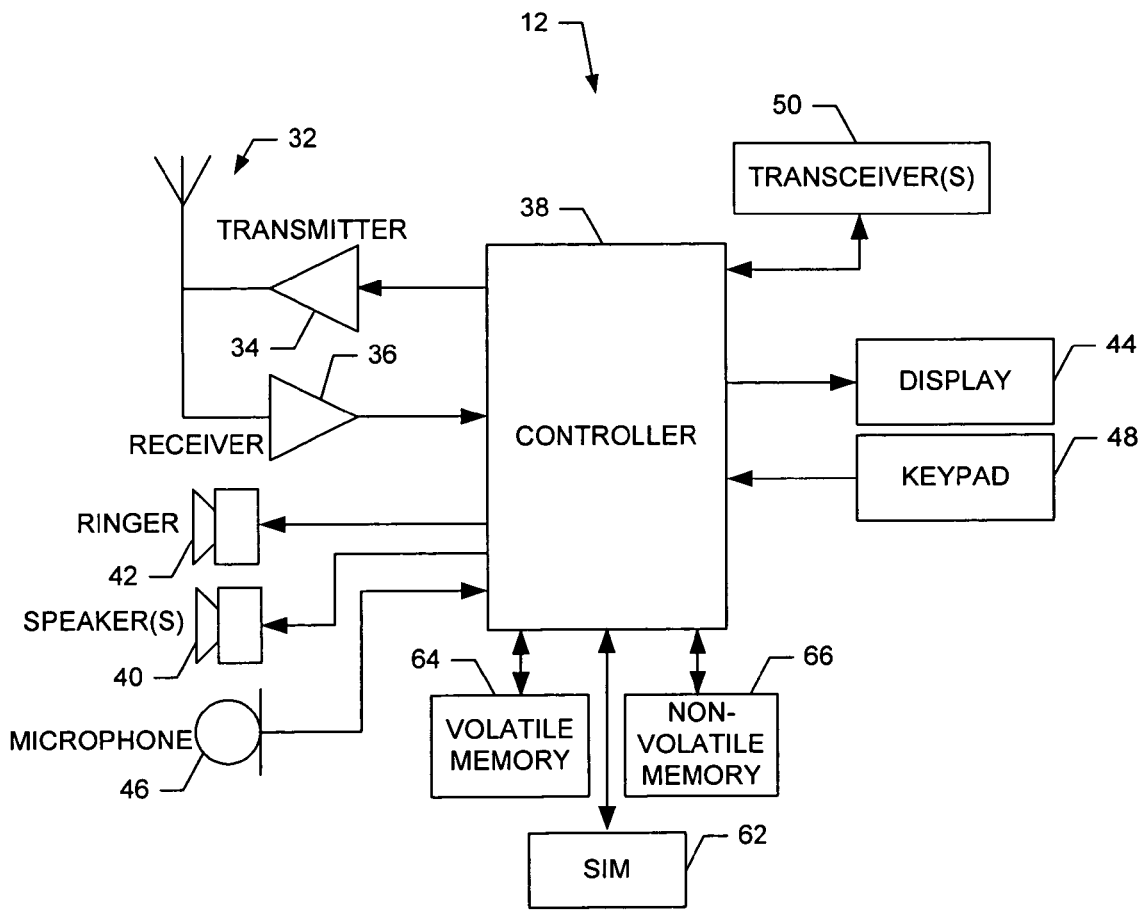
Figure 4:
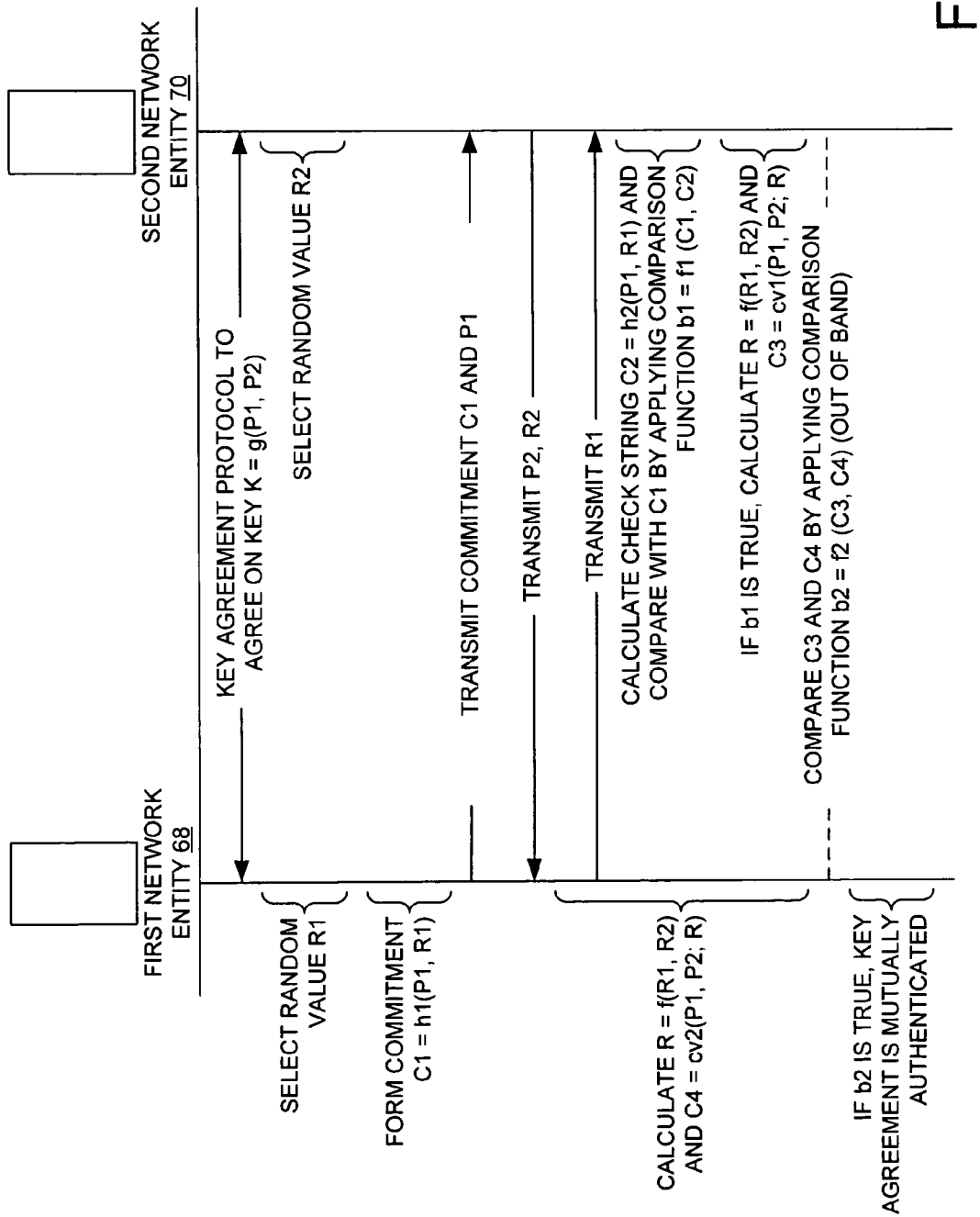
Figure 5:
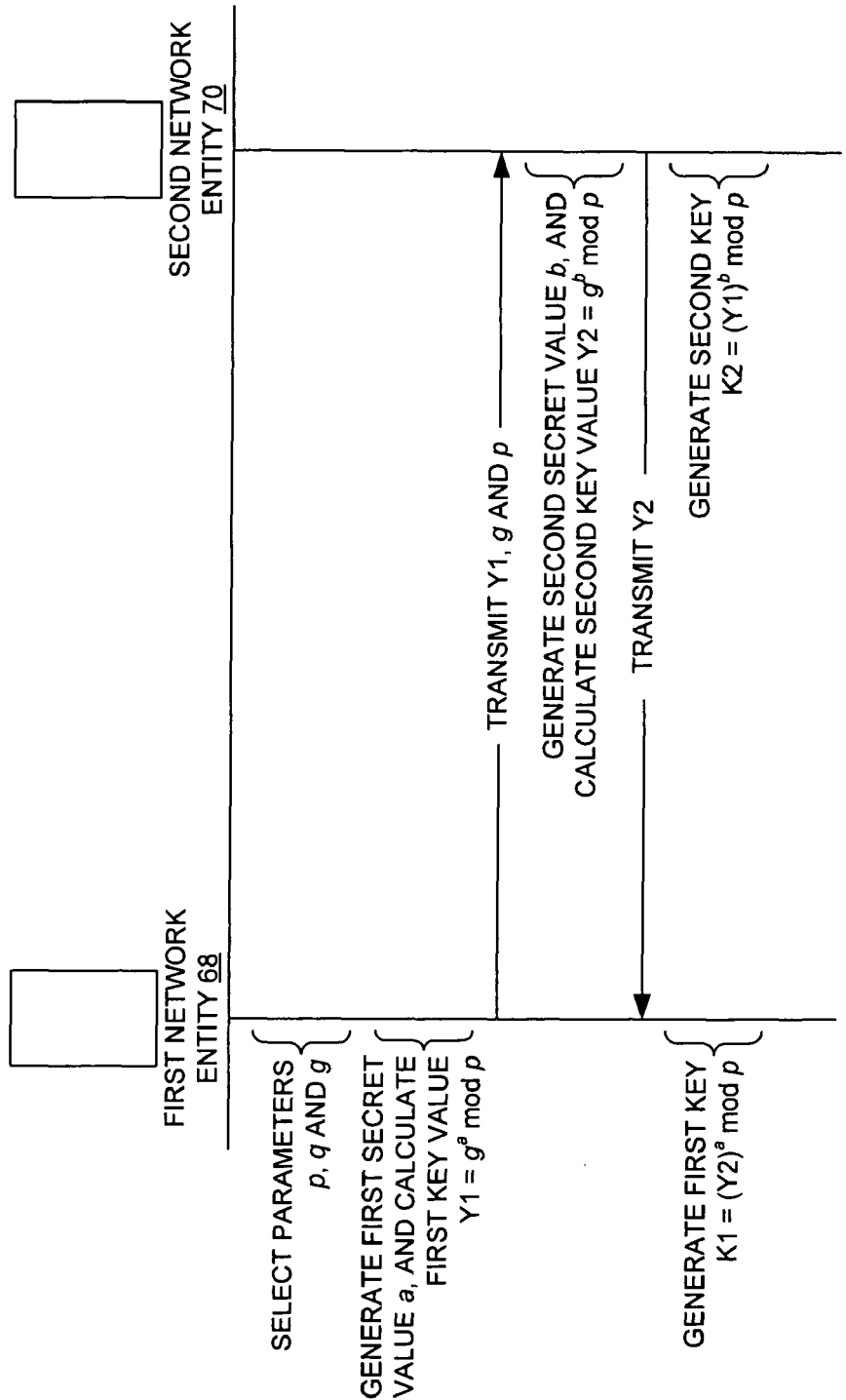
Figure 6:
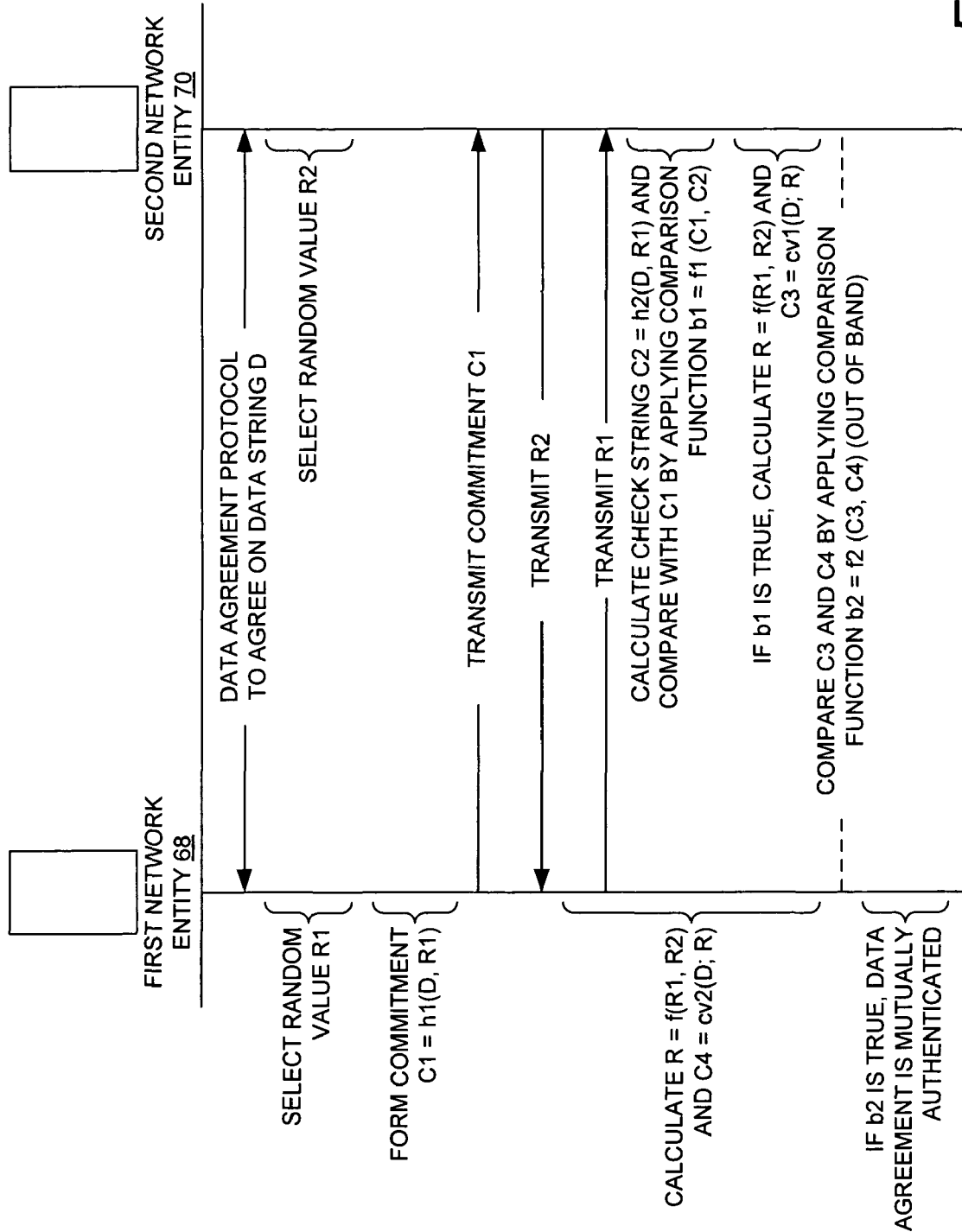

Having thus described the invention in general terms, reference will now be made to the accompanying drawings, which are not necessarily drawn to scale, and wherein:

FIG. 1 is a block diagram of one type of terminal and system that would benefit from embodiments of the present invention;

FIG. 2 is a schematic block diagram of an entity capable of operating as a terminal and/or access point, in accordance with exemplary embodiments of the present invention;

FIG. 3 is a schematic block diagram more particularly illustrating one type of terminal in accordance with one exemplary embodiment of the present invention;

FIG. 4 is a control flow diagram of various steps in a method of associating entities during establishment of a connection therebetween, in accordance with one exemplary embodiment of the present invention;

FIG. 5 is a control flow diagram of various steps in a key exchange method in the method of FIG. 4, in accordance with one exemplary embodiment of the present invention; and FIG. 6 is a control flow diagram of various steps in a method of associating entities during establishment of a connection therebetween, in accordance with another exemplary embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, the system 10 includes first and second terminals 12a, 12b capable of being wirelessly coupled to one another, such as to form an ad-hoc network therebetween. In addition, one or both of the terminals can be coupled to one or more wireless access points (APs) 14. In this regard, the terminals and APs can be configured to communicate with one another in accordance with any one or more of a number of different wireless networking techniques such as, for example, Bluetooth™ (BT) techniques, infrared (IrDA), wireless LAN (WLAN) techniques such as IEEE 802.11 (e.g., 802.11a, 802.11b, 802.11g, 802.11n, etc.), WiMAX techniques such as IEEE 802.16, ultra wideband (UWB) techniques such as IEEE 802.15, wireless universal serial bus (WUSB) techniques, near field communication (NFC) techniques or the like.

The APs 14 can be further coupled to one or more data networks, such as a local area network (LAN), a metropolitan area network (MAN), and/or a wide area network (WAN). The MSC can be directly coupled to the data network. In the illustrated exemplary embodiment, however, the AP is coupled to a gateway (GTW) 16, which is coupled to a WAN, such as the Internet 18. In turn, devices such as processing elements 20 (e.g., personal computers, server computers or the like) can be coupled to the terminal(s) via the Internet. Although not shown in FIG. 1, one or both of the terminals 12a, 12b may additionally be capable of functioning as a mobile station by communicating across one or more of a cellular network, personal communication services (PCS) network, data network (e.g., Internet) and the like.

By connecting the terminals 12a, 12b to one another and/or to the AP 14, the terminals can communicate with one another in an ad-hoc network and/or across one or more access point network(s) via the AP thereby carry out various functions of the terminals. For example, the terminals can communicate with one another and/or across one or more access point network(s) to transmit data, content or the like to, and/or receive content, data or the like from, the computing system. As used herein, the terms "data," "content," "information" and similar terms may be used interchangeably to refer to data capable of being transmitted, received and/or stored in accordance with exemplary embodiments of the present invention. Thus, use of any such terms should not be taken to limit the spirit and scope of the present invention.

Referring now to FIG. 2, a block diagram of an entity capable of operating as a terminal 12 and/or AP 14 is shown in accordance with one embodiment of the present invention. As shown, the entity includes various means for performing one or more functions in accordance with exemplary embodiments of the present invention, including those more particularly shown and described herein. It should be understood, however, that the entity may include alternative means for performing one or more like functions, without departing from the spirit and scope of the present invention. More particularly, for example, as shown in FIG. 2, the entity can include a processor 22 connected to a memory 24. The memory can comprise volatile and/or non-volatile memory, and typically stores content, data or the like. For example, the memory typically stores content transmitted from, and/or received by, the respective entity. Also for example, the memory typically stores client applications, instructions or the like for the processor to perform steps associated with operation of the respective entity in accordance with embodiments of the present invention.

As described herein, the client application(s) may each comprise software operated by the respective entity (e.g., terminal 12, AP 14). It should be understood, however, that any one or more of the client applications described herein can alternatively comprise firmware or hardware, without departing from the spirit and scope of the present invention. Generally, then, the entity can include one or more logic elements for performing various functions of one or more client application(s). As will be appreciated, the logic elements can be embodied in any of a number of different manners. In this regard, the logic elements performing the functions of one or more client applications can be embodied in an integrated circuit assembly including one or more integrated circuits integral or otherwise in communication with the entity or more particularly, for example, a processor 22 of the respective entity. The design of integrated circuits is by and large a highly automated process. In this regard, complex and powerful software tools are available for converting a logic level design into a semiconductor circuit design ready to be etched and formed on a semiconductor substrate. These software tools, such as those provided by Avant! Corporation of Fremont, Calif. and Cadence Design, of San Jose, Calif., automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In addition to the memory 24, the processor 22 can also be connected to at least one interface or other means for displaying, transmitting and/or receiving data, content or the like. In this regard, the interface(s) can include at least one communication interface 26 or other means for transmitting and/or receiving data, content or the like. As explained below, for example, the communication interface(s) can include one or more short-range communication interfaces, such as BT, IrDA, WLAN, WiMAX, UWB, WUSB and/or NFC interfaces for coupling the entity to another entity. In addition to the communication interface(s), the interface(s) can also include at least one user interface that can include a display 28 and/or a user input interface 30. The user input interface, in turn, can comprise any of a number of devices allowing the entity to receive data from a user, such as a microphone, a keypad, a touch display, a joystick or other input device.

Reference is now made to FIG. 3, which more particularly illustrates one type of terminal 12 that would benefit from embodiments of the present invention. It should be understood, however, that the terminal illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

The terminal 12 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 3, in addition to an antenna 32, the terminal includes a transmitter 34, a receiver 36, and a controller 38 or other processor that provides signals to and receives signals from the transmitter and receiver, respectively. These signals include signaling information in accordance with the air interface standard of the applicable cellular system, and also user speech and/or user generated data. In this regard, the terminal can be capable of operating with one or more air interface standards, communication protocols, modulation types, and access types. More particularly, the terminal can be capable of operating in accordance with any of a number of first generation (1G), second generation (2G), 2.5G and/or third-generation (3G) communication protocols or the like.

It is understood that the controller 38 includes the circuitry required for implementing the audio and logic functions of the terminal 12. For example, the controller may be comprised of a digital signal processor device, a microprocessor device, and various analog-to-digital converters, digital-to-analog converters, and other support circuits. The control and signal processing functions of the terminal are allocated between these devices according to their respective capabilities. The controller can additionally include an internal voice coder (VC), and may include an internal data modem (DM). Further, the controller may include the functionality to operate one or more software programs, which may be stored in memory (described below).

The terminal 12 also comprises a user interface including one or more earphones and/or speakers 40, a ringer 42, a display 44, and a user input interface, all of which are coupled to the controller 38. The user input interface, which allows the terminal to receive data, can comprise any of a number of devices allowing the terminal to receive data, such as a microphone 46, a keypad 48, a touch display and/or other input device. In embodiments including a keypad, the keypad includes the conventional numeric (0-9) and related keys (#, *), and other keys used for operating the terminal. Although not shown, the terminal can include a battery, such as a vibrating battery pack, for powering the various circuits that are required to operate the terminal, as well as optionally providing mechanical vibration as a detectable output.

The terminal 12 can also include one or more transmitters, receivers and/or transceivers 50 for sharing and/or obtaining data, such as by coupling the terminal to another terminal to form an ad-hoc network. For example, the terminal can include a Bluetooth™ (BT) transceiver operating using Bluetooth™ wireless technology developed by the Bluetooth Special Interest Group. The terminal can additionally, or alternatively, include other short-range transceivers, such as, for example an infrared (IR) transceiver, a WLAN transceiver, a WiMAX transceiver, a UWB transceiver, a WUSB transceiver and/or a near field communication (NFC) transceiver. The terminal can therefore additionally or alternatively be capable of transmitting data to and/or receiving data from devices such as other terminals in accordance with such techniques.

The terminal 12 can further include memory, such as a subscriber identity module (SIM) 62, a removable user identity module (R-UIM) or the like, which typically stores information elements related to a mobile subscriber. In addition to the SIM, the terminal can include other removable and/or fixed memory. In this regard, the terminal can include volatile memory 64, such as volatile Random Access Memory (RAM) including a cache area for the temporary storage of data. The terminal can also include other non-volatile memory 66, which can be embedded and/or may be removable. The non-volatile memory can additionally or alternatively comprise an EEPROM, flash memory or the like. The memories can store any of a number of pieces of information, and data, used by the terminal to implement the functions of the terminal. For example, the memories can store an identifier, such as an international mobile equipment identification (IMEI) code, international mobile subscriber identification (IMSI) code, mobile station integrated services digital network (MSISDN) code (mobile telephone number), Session Initiation Protocol (SIP) address or the like, capable of uniquely identifying the terminal. In addition, the memories can store one or more client applications capable of operating on the terminal.

Reference is now made to FIG. 4, which illustrates a control flow diagram of a first network entity 68 and a second network entity 70 securely associating with one another during establishment of a peer-to-peer connection therebetween, in accordance with exemplary embodiments of the present invention. As shown and described herein, the first and second network entities can comprise any of a number of different entities capable of operating in accordance with exemplary embodiments of the present invention. For example, the first network entity can comprise either the first or second terminal 12a, 12b, while the second network entity comprises the other of the first or second terminal. Alternatively, for example, the first network entity can comprise either the first or second terminal, while the second network entity comprises an AP 14. In another alternative, for example, the first network entity can comprise an AP, while the second network entity comprises the either the first or second terminal.

In a situation where the aim is to set up a data connection between the first and the second network entities 68, 70, the following steps can be taken in the method according to one exemplary embodiment of the invention. The network entities can aim at detecting whether there are other possible network entities in the vicinity to which a data connection can be set up. In this context, such a stage may be referred to as a paging stage, and can be implemented in the following manner, for example. One or both of the first and second network entities can transmit one or more paging messages or the like at intervals, and can listen to possible reply messages. Thus, in a situation where either of the first or second network entities transmits a paging message, the network entity that has received the paging message can transmit a reply message to the paging network entity 2, 3. The user of the paging network entity can then be presented with a list of other network entities that are possibly detected in the vicinity. Thus, the user can select one or more network entities from this list, and a data connection can be setup therewith. When the method according to one exemplary embodiment of the present invention is applied in setting up a data connection, it should be understood that the user need not enter an identification number or the like. In this regard, in connection with the paging stage, the network entities can transmit their own addresses or other identifiers to the other network entity involved in the data connection to be set up, these addresses uniquely identifying the network entities and can thereafter be used during communication therebetween.

After the paging stage, one of the first and second network entities 68, 70 can establish a data connection with the other network entity across an insecure channel (e.g., Bluetooth™, WLAN, WiMAX, UWB, WUSB, etc.) therebetween, establishment of the first data connection between the network entities oftentimes being referred to as an association. In this regard, association of the first and second network entities can include performing an interactive key exchange or agreement across the insecure channel during which, if successful, a shared private key K=K1=K2 can be generated in such a manner so as to be known only to the first and second network entities. The key agreement can be effectuated in any of a number of different manners. In one exemplary embodiment, however, the key agreement is effectuated in accordance with the Diffie-Hellman technique, as shown in FIG. 5, for example. It should be understood, however, that besides the Diffie-Hellman technique, exemplary embodiments of the present invention may be equally applicable to authentication of keys exchanged or otherwise agreed upon in accordance with any of a number of other techniques for securing data.

As shown in accordance with the Diffie-Hellman technique, a number of parameters, including a prime value p, a prime value q dividing p−1, and a value g of multiplicative order q mod p, can be selected by the first network entity. Alternatively, the parameters can be provided to one or both of the first and second network entities. Irrespective of how the first network entity receives the parameters, the first network entity can generate a first secret value a, such as by selecting a random value between 1 and q−1, and calculate a first key value Y1 based upon at least parameter g, such as in the following manner: $Y1=g^a \bmod p$. The first network entity can then transmit, to the second network entity, the first key value Y1 and parameters g and p, provided the parameters have not already been provided to the second network entity.

As described herein, a number of values are described as being "random" or otherwise randomly generated. It should be understood, however, that such values may be generated or otherwise selected in any of a number of different manners whereby the value may, and most typically do, change from one instance to the next. In this regard, although a value may be described as being random or randomly selected or otherwise generated, the value may be selected or otherwise generated randomly, pseudo-randomly or by one or more of a number of different algorithms for selecting or otherwise generating a plurality of different values at a plurality of different instances.

Similar to the first network entity 68, the second network entity 70 can generate a second secret value b, such as by also selecting a random (or pseudo-random) value between 1 and q−1, and calculate a second key value Y2 based upon at least parameter g, such as in the following manner: $Y2=g^b \bmod p$. The second network entity can then transmit the second key value Y2 to the first network entity. Once the first and second network entities have generated their respective first and second secret values a and b, and received the other network entity's key values Y2 and Y1, respectively, the network entities can calculate or otherwise generate first and second private keys based thereon. That is, the first network entity can generate a first private key K1 based upon the first secret value a and the second key value Y2, such as in the following manner: $K1=(Y2)^a \bmod p$. Similarly, the second network entity can generate a second private key K2 based upon the second secret value a and the first key value Y1, such as in the following manner: $K2=(Y1)^b \bmod p$. Thereafter, if the key agreement has been successful, which can mean the data transmission occurred without disturbances or outside influence, K1=K2. Thus, both the first and second network entities can be made aware of the same shared encryption key K=K1=K2, which can be used for encryption of information to be transmitted via the data connection and for decryption after the parties have checked the authenticity of each other.

As explained above, a number of variables are calculated or otherwise generated with algorithms in an algebraic group defined by integers modulo a prime number. It should be understood, however, that the algorithms by which those variables are calculated or otherwise generated can also operate in other suitable algebraic groups, if so desired. It should also be understood that if the shared encryption key K generated during the key agreement is longer than a maximum length reserved by the entities 68, 70 for such a key, the shared encryption key K utilized by the entities may be formed from the encryption key produced during the key agreement, such as by cutting the generated key K into a suitable length or by selecting predetermined parts thereof. For example in systems based on present Bluetooth™ technology it is possible to use encryption keys with the maximum length of 128 bits as a shared encryption key K.

As explained in the background section, one drawback of the Diffie-Hellman technique is that the key agreement may be vulnerable to a third party intervening in the key agreement process, thus being able to influence the communication between the first and second network entities 68, 70, and thereby having the opportunity of changing, among other exchanged variables, one or both of the transmitted first and second key values Y1, Y2. Thus, exemplary embodiments of the present invention provide a further checking stage to authenticate the key agreement between the entities. As explained below, the key agreement authentication can occur after key agreement between the first and second entities. It should be understood, however, that the key agreement authentication can alternatively occur before, or even during, the key agreement without departing from the spirit and scope of the present invention.

Referring again to FIG. 4, after the key agreement between the first and second network entities, the first and second network entities 68, 70 can both select respective, relatively long (e.g., 160 bit) random (or pseudo-random) values R1 and R2 for use in the further checking stage. Also for use in the further checking stage, the first and second network entities can generate, calculate or otherwise provide respective reusable keys or data values P1 and P2. The reusable keys can comprise any of a number of different values including, for example, the previously calculated first and second key values Y1 and Y2 (e.g., P1=Y1, P2=Y2). In such instances, the agreed secret key K can comprise a function K=g(P1, P2) of P1 and P2.

After generating the first random value R1, the first network entity 68 can commit to the first reusable key P1 by first forming a commitment based upon the first reusable key P1 and random value R1. For example, the first network entity can form a commitment C1 (first check string) by applying a one-way hash function h1 to a message including the first reusable key P1 and random value R1, such as in accordance with the following C1=h1(P1, R1). The hash function h1 can comprise any of a number of different hash functions including, for example, a SHA-256 (Secure Hash Algorithm) function, or the like. Instead of a hash function, any other function capable of computing cryptographic commitments can be used. After forming the commitment C1, the first network entity can transmit the commitment C1 and, if so desired, all or a portion of the first reusable key P1 to the second network entity. Similar to the first network entity 68, the second network entity 70 can transmit the second reusable key P2 and random value R2 to the first network entity, the second reusable key P2 and/or random value R2 capable of being transmitted in cleartext without the second network entity committing to the second reusable key.

At some point after committing to the first reusable key P1, and after receiving the second reusable key P2 and the second random value R2, the first network entity 68 can open the commitment by transmitting the first random value R1 to the second network entity 70. Additionally, if the second network entity does not have prior knowledge of the first reusable key P1, or has not otherwise received the first reusable key P1, the first network entity can also transmit the first reusable key P1 (or a portion thereof) to the second network entity. In this manner, the second network entity can check that the committed first reusable key P1 (in commitment C1) matches the previously received first reusable key P1 (received along with commitment C1). More particularly, the second network entity can calculate a check string C2 by applying a one-way hash function h to a message including the previously received first reusable key P1 and the now received first random value R1, such as in accordance with the following C2=h2(P1, R1) in a manner similar to the first network entity forming commitment C1 (e.g., h1=h2). The second network entity can then compare the commitment C1 with the check string C2 by applying a comparison function b1=f1(C1, C2). The comparison function can compare C1 and C2 in any of a number of different manners, but in one exemplary embodiment, the comparison function comprises an equality check to identify a match between C1 and C2 (i.e., C1=C2). If the result of the comparison function b1 is false (e.g., C1≠C2), the key agreement is considered not authenticated, and the second network entity can abort association of the first and second network entities.

If the result of the comparison function b1 is true (e.g., C1=C2), the second network entity 70 successfully checks the committed first reusable key P1, and can calculate a third check string C3 based upon the first and second reusable keys P1 and P2, and the first and second random values R1 and R2. Similarly, at any point after receiving the second reusable key and random value P2 and R2, the first network entity can calculate a fourth check string C4 based upon P1 and P2, and R1 and R2. In this regard, as the first network entity 68 is capable of calculating the fourth check string before the second network entity calculates the third check string (the second network entity first checking the commitment), the first network entity can take more time in calculating the fourth check string in instances in which it is desirable for the network entities to have acquired their respective third and fourth check strings by approximately the same time.

The network entities 68, 70 can calculate the third and fourth check strings C3 and C4 in any of a number of different manners. For example, the network entities can first calculate a combination R of the first and second random values R1 and R2 by applying a combining function (e.g., hash function, concatenation, etc.) to the random values, such as in accordance with the following: R=f(R1, R2). The network entities can then calculate the third and fourth check strings C3 and C4 by applying respective functions cv1 and cv2 to the combination R and the first and second reusable keys P1 and P2, where the functions cv1 and cv2 may be the same function or different functions. For example, the network entities can calculate the third and fourth check strings by applying a MAC (Message Authentication Code) function to P1 and P2 as an input message and with R as a key to thereby produce short output check strings C3 and C4. To further reduce the size of the output check strings, the third and fourth check strings can comprise truncated MACs, if so desired.

After the network entities 68, 70 have calculated the third and fourth check strings C3 and C4, the check strings can be compared by applying a comparison function b2=f2(C3, C4). The comparison function can compare C3 and C4 in any of a number of different manners, but in one exemplary embodiment, the comparison function comprises an equality check to identify a match between C3 and C4 (i.e., C3=C4). The comparison function can be applied to the third and fourth check strings in any of a number of different manners. For example, whereas the previous message exchanges occurred an in-band manner across the insecure channel (e.g., Bluetooth™, WLAN, WiMAX, UWB, WUSB, etc.) between the network entities, the comparison function can be applied in an out-of-band manner. For example, one of the network entities can transmit its respective third or fourth check string to the other network entity across an out-of-band channel (e.g., IR, NFC, etc.) such that the receiving network entity can apply the comparison function to compare the third and fourth check strings, or facilitate comparison of the check strings such as by presenting the check strings for a user comparison. In other out of band examples, the comparison function can be applied to compare the third and fourth check strings by presenting the third and fourth check strings for comparison by users of the network entities (or the user of one or both of the network entities). In such instances where user(s) compare the third and fourth check strings, the user(s) can indicate a match or mismatch to one or both of the network entities, such as via a user input interface of the respective entit(ies).

Irrespective of how the third and fourth check strings C3 and C4 are compared, if result of the comparison function b2 is false, the key agreement is considered not authenticated, and one or both of the network entities 68, 70 can abort their association. If the result of the comparison function b1 is true, however, the key agreement is considered authenticated such that the network entities can assume that the shared encryption key K is reliable. The shared encryption key K can then be used by the network entities for data encryption and decryption to thereby securely communicate across the otherwise insecure channel.

As will be appreciated, in various instances one or both the first and second reusable keys P1 and P2 may be known to one or both of the network entities 68, 70 before the further checking stage. In such instances, the entit(ies) having prior knowledge of both the first and second reusable keys P1 and P2 need not receive either of those keys from the other entity. More particularly, if both reusable keys are known to the first network entity, the first network entity need not receive the second reusable key P2 from the second network entity. And if both reusable keys are known to the second network entity, the second network entity need not receive the first reusable key P1 from the first network entity. Also, if reusable key P1 is known to the second entity a priori, or if P1 is transmitted to the second entity along with the commitment C1, the first network entity need not include reusable key P1 in the calculation of the commitment C1. If reusable key P1 is revealed to the second entity only along with the first random value, however, then P1 will typically be included in the calculation of the commitment, as described above.

As will also be appreciated, reusable keys P1 and P2 may include not only the keys themselves, but entire key agreement messages. In such instances, a separate key agreement protocol may not be required, as the key agreement messages can be piggybacked with the messages for transmitting the commitment, and the respective random values.

Further, exemplary embodiments of the present invention may generally be applicable to authenticating any data agreement between entities. As shown in FIG. 6, then, authenticating a data agreement in accordance with exemplary embodiments of the present invention can include first and second network entities 68, 70 performing an interactive data agreement across the insecure channel during which, if successful, a data string D can be generated or otherwise agreed upon in such a manner so as to be known to the first and second network entities. As shown, the further checking stage can proceed in a manner similar to that of FIG. 4. In contrast to the further checking stage shown in FIG. 4, however, the first network entity of FIG. 6 can form a commitment C1 (first check string) by applying a one-way hash function h1 to a message including data string D and random value R1 (i.e., C1=h1(D, R1). The first network entity can then transmit the commitment C1 to the second network entity, with the second network entity transmitting the second random value R2 to the first network entity.

As also shown in FIG. 6, after receiving the first random value R1 from the first network entity 68, the second network entity 70 can check that the committed data string D (in commitment C1) matches the data string D known to the second network entity. In this regard, the second network entity can calculate a check string C2 by applying a one-way hash function h2 to a message including the known data string D and the now received first random value R1, such as in accordance with the following C2=h2(D, R1) in a manner similar to the first network entity forming commitment C1 (e.g., h1=h2). As before, the second network entity can then compare the commitment C1 with the check string C2 by applying a comparison function b1, such as to identify a match (i.e., C1=C2). If the result of the comparison function is false (e.g., C1≠C2), the data agreement is considered not authenticated, and the second network entity can abort association of the first and second network entities. Otherwise, if the result of the comparison function b1 is true (e.g., C1=C2), the network entities can calculate third and fourth check strings C3 and C4 based upon the known data string D, and the first and second random values R1 and R2, such as by calculating combination R as before and applying respective functions cv1 and cv2 (e.g., MAC function) to R and D, and if so desired, truncating the resulting MACs. The third and fourth check strings C3 and C4, the check strings can be compared by applying a comparison function b2, such as to identify a match (i.e., C3=C4), as before.

As will be appreciated, although the random values R1 and R2 may differ from instance to instance of associating the first network entity with the second and/or other network entities, and/or associating the second network entity with the first and/or other network entities, the first and second keys P1 and P2 (or data string D) may be reusable from one instance to the next. Exemplary embodiments of the present invention therefore avoid generating new keys P1 and P2 for each association of two network entities, which may otherwise require an undesirable amount of time and resources. Also, by only requiring the exchange of three in-bound messages (e.g., transmitting C1 and P1, transmitting P2 and R2, and transmitting R1), exemplary embodiments of the present invention provide an efficient checking stage for authenticating the key agreement between the network entities.

According to one aspect of the present invention, the functions performed by one or more of the entities of the system, such as the one or both of the first and second network entities 68, 70 (e.g., terminal 12, AP 14, etc.) may be performed by various means, such as hardware and/or firmware, including those described above, alone and/or under control of a computer program product. The computer program product for performing one or more functions of embodiments of the present invention includes a computer-readable storage medium, such as the non-volatile storage medium, and software including computer-readable program code portions, such as a series of computer instructions, embodied in the computer-readable storage medium.

In this regard, FIGS. 4, 5 and 6 are control flow diagrams of methods, systems and program products according to exemplary embodiments of the present invention. It will be understood that each block or step of the control flow diagrams, and combinations of blocks or steps of the control flow diagrams, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the control flow diagrams' block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow diagrams' block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the control flow diagrams' block(s) or step(s).

Accordingly, blocks or steps of the control flow diagrams support combinations of means for performing the specified functions, combinations of steps for performing the specified functions and program instruction means for performing the specified functions. It will also be understood that one or more blocks or steps of the control flow diagrams, and combinations of blocks or steps in the control flow diagrams, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:

forming a commitment to a first data value, including applying a hash function to a message including a selected first random value to thereby form a first check string, and directing transmission of the first check string to another apparatus;

receiving a selected second random value from the other apparatus; thereafter, opening the commitment to the first data value, including directing transmission of the first random value to the other apparatus to enable the other apparatus to check the first data value based upon a comparison between the first check string and a second check string having been formed from application of the hash function to another message including the first random value, the other apparatus being configured to thereafter apply the same or a different hash function to a message including the first data value and the first and second random values to thereby form a third check string;

applying the same or the different hash function to a message including a second data value and the first and second random values to thereby form a fourth check string, the fourth check string being formed without the other apparatus forming a commitment to the second data value or opening a commitment to the second data value; and comparing or facilitating comparison between the third and fourth check strings, data agreement between the first and second data values being authenticated based upon the comparison, wherein the comparing or facilitating comparison between the third and fourth check strings occurs when the other apparatus successfully checks the first data value.

2. An apparatus according to claim 1, wherein forming a commitment to a first data value comprises forming a commitment to a first key, wherein directing transmission of the first check string further includes directing transmission of the first key, and wherein directing transmission of the first random value comprises directing transmission of the first random value to enable the other apparatus to check the first key based upon the second check string having been formed from application of the hash function to the other message further including the first key transmitted with the first check string.

3. An apparatus according to claim 2, wherein the second data value comprises a second key, wherein receiving a selected second random value further comprises receiving the second key from the other apparatus, and wherein applying the same or the different hash function to a message including a second data value and the first and second random values comprises applying the same or the different hash function to a message including the received second key and the first and second random values to thereby form a fourth check string.

4. An apparatus according to claim 1, wherein the first and second data values comprise the same data string known to both the apparatus and the other apparatus before authenticating the data agreement, wherein forming a commitment to a first data value comprises forming a commitment to the data string, and wherein directing transmission of the first random value comprises directing transmission of the first random value to enable the other apparatus to check the data string based upon a second check string having been formed from application of the hash function to another message further including the data string known to the other apparatus.

5. An apparatus according to claim 4, wherein applying the same or the different hash function to a message including a second data value and the first and second random values comprises applying the same or the different hash function to a message including the data string known to the apparatus and the first and second random values.

6. An apparatus according to claim 1, wherein forming a commitment to a first data value, receiving a second random value, opening the commitment, applying the same or the different hash function to a message including a second data value and the first and second random values to thereby form a fourth check string, and comparing or facilitating comparison between the third and fourth check strings occur at a plurality of instances of authenticating the data agreement with the other apparatus or at least one further apparatus, and wherein the selected first random value differs for at least some of the instances, and wherein the first data value is the same for at least some of the instances.

7. An apparatus according to claim 1, wherein applying a hash function to a message including the selected first random value comprises applying a hash function to a message including the selected first random value and the first data value.

8. An apparatus according to claim 1, wherein forming a commitment to a first data value comprises applying a hash function to a message including the selected first random value and independent of the first data value, and directing transmission of the first check string and the first data value to the other apparatus.

9. An apparatus comprising a processor and a memory storing executable instructions that in response to execution by the processor cause the apparatus to at least perform the following:

receiving a first check string, another apparatus having formed a commitment to a first data value by application of a hash function to a message including a selected first random value;

directing transmission of a selected second random value to the other apparatus; thereafter, receiving the first random value, the other apparatus having opened the commitment to the first data value by directing transmission of the first random value to the apparatus;

checking the first data value based upon a comparison between the first check string and a second check string having been formed from application of the hash function to another message including the first random value;

applying the same or a different hash function to a message including the first data value and the first and second random values to thereby form a third check string, the other apparatus being configured to apply the same or the different hash function to a message including a second data value and the first and second random values to thereby form a fourth check string, the fourth check string being formed without the apparatus forming a commitment to the second data value or opening a commitment to the second data value; and comparing or facilitating comparison between the third and fourth check strings, data agreement between the first and second data values being authenticated based upon the comparison, wherein comparing or facilitating comparison between the third and fourth check strings occurs when the apparatus successfully checks the first data value.

10. An apparatus according to claim 9, wherein the first data value comprises a first key, wherein receiving the first check string further comprises receiving the first key, and wherein checking the first data value comprises checking the first key based upon a second check string having been formed from application of the hash function to the other message further including the first key transmitted with the first check string.

11. An apparatus according to claim 10, wherein the second data value comprises a second key, wherein directing transmission of a selected second random value further comprises directing transmission of the second key to the other apparatus to enable the other apparatus to apply the same or the different hash function to a message including the received second key and the first and second random values to thereby form a fourth check string.

12. An apparatus according to claim 9, wherein the first and second data values comprise the same data string known to both the apparatus and the other apparatus before authenticating the data agreement, wherein the receiving a first check string comprises receiving a first check string having been formed by application of a hash function to a message including the data string and the selected first random value with the other apparatus forming a commitment to the data string, and wherein checking the first data value comprises checking the first key based upon a second check string having been formed from application of the hash function to another message further including the data string known to the apparatus.

13. An apparatus according to claim 12, wherein directing transmission of a selected second random value comprises directing transmission of the second random value to the other apparatus to enable the other apparatus to apply the same or the different hash function to a message including the data string known to the other apparatus and the first and second random values.

14. An apparatus according to claim 9, wherein receiving a first check string, directing transmission of a selected second random value, receiving the first random value, checking the first data value, applying the same or a different hash function to a message including the first data value and the first and second random values to thereby form a third check string, and comparing or facilitating comparison between the third and fourth check strings occur at a plurality of instances of authenticating the data agreement with the other apparatus or at least one further apparatus, and wherein the selected second random value differs for at least some of the instances, and wherein the second data value is the same for at least some of the instances.

15. A method comprising:

forming a commitment to a first data value at a first apparatus, including applying a hash function to a message including a selected first random value to thereby form a first check string, and directing transmission of the first check string to a second apparatus;

receiving a selected second random value at the first apparatus from the second apparatus; thereafter, opening the commitment to the first data value at the first apparatus, including directing transmission of the first random value to the second apparatus to enable the second apparatus to check the first data value based upon a comparison between the first check string and a second check string having been formed from application of the hash function to another message including the first random value, the second apparatus being configured to thereafter apply the same or a different hash function to a message including the first data value and the first and second random values to thereby form a third check string;

applying the same or the different hash function to a message including a second data value and the first and second random values to thereby form a fourth check string at the first apparatus, the fourth check string being formed without the second apparatus forming a commitment to the second data value or opening a commitment to the second data value; and comparing or facilitating comparison between the third and fourth check strings, data agreement between the first and second data values being authenticated based upon the comparison, wherein comparing or facilitating comparison between the third and fourth check strings occurs when the second apparatus successfully checks the first data value.

16. A method according to claim 15, wherein forming a commitment to a first data value comprises forming a commitment to a first key, wherein directing transmission of the first check string further includes directing transmission of the first key, and wherein directing transmission of the first random value comprises directing transmission of the first random value to enable the second apparatus to check the first key based upon the second check string having been formed from application of the hash function to the other message further including the first key transmitted with the first check string.

17. A method according to claim 16, wherein the second data value comprises a second key, wherein receiving a selected second random value further comprises receiving the second key at the first apparatus from the second apparatus, and wherein applying the same or the different hash function to a message including a second data value and the first and second random values comprises applying the same or the different hash function to a message including the received second key and the first and second random values to thereby form a fourth check string.

18. A method according to claim 15, wherein the first and second data values comprise the same data string known to both the first and second apparatuses before authenticating the data agreement, wherein forming a commitment to a first data value comprises forming a commitment to the data string, and wherein directing transmission of the first random value comprises directing transmission of the first random value to enable the second apparatus to check the data string based upon a second check string having been formed from application of the hash function to another message further including the data string known to the second apparatus.

19. A method according to claim 18, wherein applying the same or the different hash function to a message including a second data value and the first and second random values comprises applying the same or the different hash function to a message including the data string known to the first apparatus and the first and second random values.

20. A method according to claim 15, wherein forming a commitment to a first data value, receiving a selected second random value, opening the commitment, applying the same or the different hash function to a message including a second data value and the first and second random values to thereby form a fourth check string, and comparing or facilitating comparison between the third and fourth check strings occur at a plurality of instances of authenticating the data agreement between the first apparatus and the second apparatus or at least one other apparatus, wherein the selected first random value differs for at least some of the instances, and wherein the first data value is the same for at least some of the instances.

21. A method according to claim 15, wherein applying a hash function to a message including the selected first random value comprises applying a hash function to a message including the selected first random value and the first data value.

22. A method according to claim 15, wherein forming a commitment to a first data value comprises applying a hash function to a message including the selected first random value comprises applying a hash function to a message including the selected first random value and independent of the first data value, and directing transmission of the first check string and the first data value to the second apparatus.

23. A method comprising:

receiving a first check string at a second apparatus, a first apparatus having formed a commitment to a first data value by application of a hash function to a message including a selected first random value;

directing transmission of a selected second random value to the first apparatus from the second apparatus; thereafter, receiving the first random value at the second apparatus, the first apparatus having opened the commitment to the first data value by directing transmission of the first random value to the second apparatus;

checking the first data value at the second apparatus based upon a comparison between the first check string and a second check string having been formed from application of the hash function to another message including the first random value;

applying the same or a different hash function to a message including the first data value and the first and second random values to thereby form a third check string at the second apparatus, the first apparatus being configured to apply the same or the different hash function to a message including a second data value and the first and second random values to thereby form a fourth check string, the fourth check string being formed without the second apparatus forming a commitment to the second data value or opening a commitment to the second data value; and comparing or facilitating comparison between the third and fourth check strings, data agreement between the first and second data values being authenticated based upon the comparison, wherein comparing or facilitating comparison between the third and fourth check strings occurs when the second apparatus successfully checks the first data value.

24. A method according to claim 23, wherein the first data value comprises a first key, wherein receiving the first check string further comprises receiving the first key, and wherein checking the first data value comprises checking the first key based upon a second check string having been formed from application of the hash function to the other message further including the first key transmitted with the first check string.

25. A method according to claim 24, wherein the second data value comprises a second key, wherein directing transmission of a selected second random value further comprises directing transmission of the second key to the first apparatus to enable the first apparatus to apply the same or the different hash function to a message including the received second key and the first and second random values to thereby form a fourth check string.

26. A method according to claim 23, wherein the first and second data values comprise the same data string known to both the first and second apparatuses before authenticating the data agreement, wherein receiving a first check string comprises receiving a first check string having been formed by application of a hash function to a message including the data string and the selected first random value with the first apparatus forming a commitment to the data string, and wherein checking the first data value comprises checking the first key based upon a second check string having been formed from application of the hash function to another message further including the data string known to the second apparatus.

27. A method according to claim 26, wherein directing transmission of a selected second random value comprises directing transmission of the second random value to the first apparatus to enable the first apparatus to apply the same or the different hash function to a message including the data string known to the first apparatus and the first and second random values.

28. A method according to claim 23, wherein receiving a first check string, directing transmission of a selected second random value, receiving the first random value, checking the first data value, applying the same or a different hash function to a message including the first data value and the first and second random values to thereby form a third check string, and comparing or facilitating comparison between the third and fourth check strings occur at a plurality of instances of authenticating the data agreement between the second apparatus and the first apparatus or at least one other apparatus, wherein the selected second random value differs for at least some of the instances, and wherein the second data value is the same for at least some of the instances.

29. A computer program product comprising at least one non-transitory storage medium having computer-readable program code portions stored therein that in response to execution by a processor, cause an apparatus to at least perform the following:

forming a commitment to a first data value at a first apparatus, including applying a hash function to a message including a selected first random value to thereby form a first check string, and directing transmission of the first check string to a second apparatus;

receiving a selected second random value at the first apparatus from the second apparatus; and thereafter, opening the commitment to the first data value at the first apparatus, including directing transmission of the first random value to the second apparatus to enable the second apparatus to check the first data value based upon a comparison between the first check string and a second check string having been formed from application of the hash function to another message including the first random value, the second apparatus being configured to thereafter apply the same or a different hash function to a message including the first data value and the first and second random values to thereby form a third check string;

applying the same or the different hash function to a message including a second data value and the first and second random values to thereby form a fourth check string at the first apparatus, the fourth check string being formed without the second apparatus forming a commitment to the second data value or opening a commitment to the second data value; and comparing or facilitating comparison between the third and fourth check strings, data agreement between the first and second data values being authenticated based upon the comparison, wherein comparing or facilitating comparison between the third and fourth check strings occurs when the second apparatus successfully checks the first data value.

30. A computer program product according to claim 29, wherein forming a commitment to a first data value comprises forming a commitment to a first key, wherein directing transmission of the first check string further includes directing transmission of the first key, and wherein directing transmission of the first random value comprises directing transmission of the first random value to enable the second apparatus to check the first key based upon the second check string having been formed from application of the hash function to the other message further including the first key transmitted with the first check string.

31. A computer program product according to claim 30, wherein the second data value comprises a second key, wherein receiving a selected second random value further comprises receiving the second key at the first apparatus from the second apparatus, and wherein applying the same or the different hash function to a message including a second data value and the first and second random values comprises applying the same or the different hash function to a message including the received second key and the first and second random values to thereby form a fourth check string.

32. A computer program product according to claim 29, wherein the first and second data values comprise the same data string known to both the first and second apparatuses before authenticating the data agreement, wherein forming a commitment to a first data value comprises forming a commitment to the data string, and wherein directing transmission of the first random value comprises directing transmission of the first random value to enable the second apparatus to check the data string based upon a second check string having been formed from application of the hash function to another message further including the data string known to the second apparatus.

33. A computer program product according to claim 32, wherein applying the same or the different hash function to a message including a second data value and the first and second random values comprises applying the same or the different hash function to a message including the data string known to the first apparatus and the first and second random values.

34. A computer program product according to claim 29, wherein forming a commitment to a first data value, receiving a second random value, opening the commitment, applying the same or the different hash function to a message including a second data value and the first and second random values to thereby form a fourth check string, and comparing or facilitating comparison between the third and fourth check strings occur at a plurality of instances of authenticating the data agreement between the first apparatus and the second apparatus or at least one other apparatus, wherein the selected first random value differs for at least some of the instances, and wherein the first data value is the same for at least some of the instances.

35. A computer program product according to claim 29, wherein applying a hash function to a message including the selected first random value comprises applying a hash function to a message including the selected first random value and the first data value.

36. A computer program product according to claim 29, wherein forming a commitment to a first data value comprises applying a hash function to a message including the selected first random value comprises applying a hash function to a message including the selected first random value and independent of the first data value, and directing transmission of the first check string and the first data value to the second apparatus.

37. A computer program product comprising at least one non-transitory storage medium having computer-readable program code portions stored therein that in response to execution by a processor, cause an apparatus to at least perform the following:
receiving a first check string a second apparatus, a first apparatus having formed a commitment to a first data value by application of a hash function to a message including a selected first random value;
directing transmission of a selected random value to the first apparatus from the second apparatus; and thereafter,
receiving the first random value at the second apparatus, the first apparatus having opened the commitment to the first data value by directing transmission of the first random value to the second apparatus;
checking the first data value at the second apparatus based upon a comparison between the first check string and a second check string having been formed from application of the hash function to another message including the first random value;
applying the same or a different hash function to a message including the first data value and the first and second random values to thereby form a third check string at the second apparatus, the first apparatus being configured to apply the same or the different hash function to a message including a second data value and the first and second random values to thereby form a fourth check string, the fourth check string being formed without the second apparatus forming a commitment to the second data value or opening a commitment to the second data value; and
comparing or facilitating comparison between the third and fourth check strings, data agreement between the first and second data values being authenticated based upon the comparison,
wherein comparing or facilitating comparison between the third and fourth check strings occur when the apparatus successfully checks the first data value.

38. A computer program product according to claim 37, wherein the first data value comprises a first key, wherein receiving the first check string further comprises receiving the first key, and
wherein checking the first data value comprises checking the first key based upon a second check string having been formed from application of the hash function to the other message further including the first key transmitted with the first check string.

39. A computer program product according to claim 38, wherein the second data value comprises a second key, wherein directing transmission of a selected random value further comprises directing transmission of the second key to the first apparatus to enable the first apparatus to apply the same or the different hash function to a message including the received second key and the first and second random values to thereby form a fourth check string.

40. A computer program product according to claim 37, wherein the first and second data values comprise the same data string known to both the first and second apparatuses before authenticating the data agreement, wherein receiving a first check string comprises receiving a first check string having been formed by application of a hash function to a message including the data string and the selected first random value with the first apparatus forming a commitment to the data string, and
wherein checking the first data value comprises checking the first key based upon a second check string having been formed from application of the hash function to another message further including the data string known to the second apparatus.

41. A computer program product according to claim 40, wherein directing transmission of a selected second random value comprises directing transmission of the second random value to the first apparatus to enable the first apparatus to apply the same or the different hash function to a message including the data string known to the first apparatus and the first and second random values.

42. A computer program product according to claim 37, wherein receiving a first check string, directing transmission of a selected second random value, receiving the first random value, checking the first data value, applying the same or a different hash function to a message including the first data value and the first and second random values to thereby form a third check string, and comparing or facilitating comparison between the third and fourth check strings occur at a plurality of instances of authenticating the data agreement between the second apparatus and the first apparatus or at least one other apparatus,
wherein the selected second random value differs for at least some of the instances, and wherein the second data value is the same for at least some of the instances.

* * * * *

UNITED STATES PATENT AND TRADEMARK OFFICE
CERTIFICATE OF CORRECTION

| | | |
|---|---|---|
| PATENT NO. | : 7,783,041 B2 | Page 1 of 1 |
| APPLICATION NO. | : 11/242374 | |
| DATED | : August 24, 2010 | |
| INVENTOR(S) | : Asokan et al. | |

It is certified that error appears in the above-identified patent and that said Letters Patent is hereby corrected as shown below:

Column 18,

Line 27, "wherein the receiving" should read --wherein receiving--.

Signed and Sealed this
Third Day of January, 2012

David J. Kappos
*Director of the United States Patent and Trademark Office*